United States Patent
Naik et al.

(10) Patent No.: US 9,669,755 B2
(45) Date of Patent: Jun. 6, 2017

(54) ACTIVE VISION SYSTEM WITH SUBLIMINALLY STEERED AND MODULATED LIGHTING

(75) Inventors: Sanjeev M. Naik, Troy, MI (US); Wende Zhang, Troy, MI (US); Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1269 days.

(21) Appl. No.: 13/291,314

(22) Filed: Nov. 8, 2011

(65) Prior Publication Data

US 2013/0113935 A1    May 9, 2013

(51) Int. Cl.
*H04N 7/18* (2006.01)
*B60Q 1/08* (2006.01)

(52) U.S. Cl.
CPC .......... *B60Q 1/085* (2013.01); *B60Q 2300/45* (2013.01)

(58) Field of Classification Search
CPC ............................ B60Q 1/085; B60Q 2300/45
USPC ........................................................ 348/148
See application file for complete search history.

(56) References Cited

U.S. PATENT DOCUMENTS

| | | | |
|---|---|---|---|
| 6,824,281 B2* | 11/2004 | Schofield et al. | 359/876 |
| 2005/0027419 A1* | 2/2005 | Horii et al. | 701/49 |
| 2005/0169000 A1* | 8/2005 | Hasegawa | 362/466 |
| 2007/0025112 A1* | 2/2007 | Kuhl et al. | 362/466 |
| 2008/0129206 A1* | 6/2008 | Stam et al. | 315/82 |
| 2009/0016073 A1* | 1/2009 | Higgins-Luthman et al. | 362/465 |
| 2010/0045797 A1* | 2/2010 | Schofield et al. | 348/148 |
| 2010/0265328 A1* | 10/2010 | Chou | 348/143 |

* cited by examiner

*Primary Examiner* — Christopher S Kelley
*Assistant Examiner* — Matthew Kwan
(74) *Attorney, Agent, or Firm* — Quinn IP Law

(57) ABSTRACT

An active vision system includes an image capture device for capturing images in a region exterior of a vehicle and a headlamp control unit for controlling a vehicle headlamp beam for illuminating an environment exterior of a vehicle. The headlamp control unit is configured to selectively illuminate between making a path of travel of a road visible to a driver of the vehicle and making the region exterior of the vehicle visible for capturing images by the image capture device. The headlamp control unit utilizes a duty cycle for controlling a first cycle time that the headlamp beam illuminates the path of travel for making the road visible to the driver and for controlling a second cycle time that the headlamp beam makes the captured region visible for capturing images by the image capture device.

20 Claims, 3 Drawing Sheets

ACTIVE VISION SYSTEM WITH SUBLIMINALLY STEERED AND MODULATED LIGHTING

BACKGROUND OF INVENTION

An embodiment relates generally to lighting systems, and more specifically, to an illumination of enhanced image capture systems.

Vehicle safety systems may include vision based systems that capture images of objects for classifying and identifying objects. The objects may include other vehicles, pedestrians, roads, and other objects in or near a course of travel of the vehicle. In order to capture images from a vision system, the illumination of the captured view must be adequate to properly illuminate the object, especially at night. The camera is fixed and pointed in the view of direction of the illumination as generated by the headlamps. As a result, the vision based system captures and recognizes objects that are illuminated in the field of radiated light, and more specifically, the section of the radiated light where the illumination is more intensified. That is, the illumination from the headlamp beams are more intensified where focus point of the headlamp beams are located. The intensity of the illumination of the headlamp beam is diminished in areas further from the focus point of the headlamp beam. Therefore objects to the side of the road, such as a pedestrian or an animal, may not be adequately illuminated since the focus of the headlamp beams is directed forward of the vehicle on the path of travel. As a result, objects to the side of the road may not be captured and illuminated due to the inadequacy of illumination on the object.

SUMMARY OF INVENTION

An advantage of an embodiment is selective illumination of a region within a captured portion of an image for detecting whether an object or condition is present. The system autonomously synchronizes steerable headlamp beams and an image capture device for illuminating a respective region other than a primary illuminated region to provide adequate lighting so that the selected region targeted for object detection by the image capture device is illuminated. Moreover, an operating mode scenario is selected for determining the type of scanning that is performed on the secondary region in addition to the duty cycle used to illuminate and capture objects in the secondary region. Another advantage is the system utilizing fast electronic switching and a low duty cycle so that the driver of the vehicle does not notice the headlamp switching between the primary region and the secondary region.

An embodiment contemplates an active vision system includes an image capture device for capturing images in a region exterior of a vehicle and a headlamp control unit for controlling a vehicle headlamp beam for illuminating an environment exterior of a vehicle. The headlamp control unit is configured to selectively illuminate between making a path of travel of a road visible to a driver of the vehicle and making the region exterior of the vehicle visible for capturing images by the image capture device. The headlamp control unit utilizes a duty cycle for controlling a first cycle time that the headlamp beam illuminates the path of travel for making the road visible to the driver and for controlling a second cycle time that the headlamp beam makes the captured region visible for capturing images by the image capture device.

DETAILED DESCRIPTION

Figure 1:
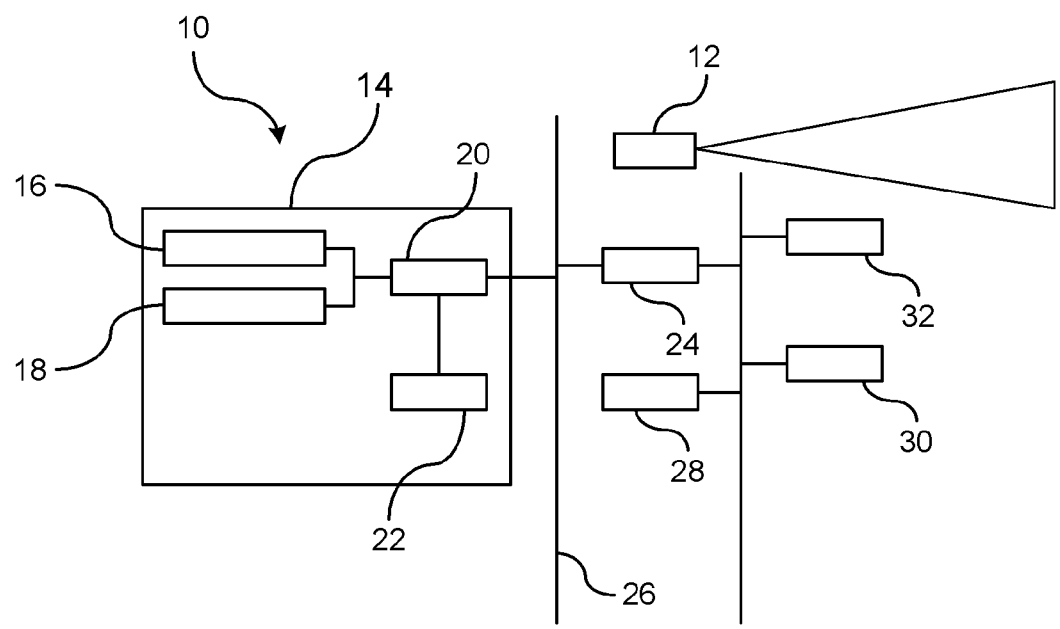
FIG. 1 is a block diagram of the active vision system.

FIG. 1 shows a block diagram of an active vision system 10 for selectively illuminating regions exterior of a vehicle and capturing images of the illuminated regions. The active vision system 10 includes a vision capture device 12 for capturing images of regions exterior of a vehicle. The image capture device 12 may include a camera, a video camera, or any other imaging device in which an image may be extracted. The image capture device 12 is used to detect objects along a traveled route including road markings (e.g., curbs, lane markings, dividers, pavement changes) for determining road geometry, road signs for road sign recognition, pedestrians, animals, buildings, sidewalks, trees, shrubs, and other objects. Preferably image capture device is an electronic camera that takes multiple images and stores them as single frames of video. Instead of storing consecutive frames on tape to form a video, a single frame is extracted from the output video signal and saved in memory for object recognition and detection.

The active vision system 10 includes a headlamp control unit 14. The headlamp control unit 14 includes at least two headlamps 16 and 18 and an adaptive front lighting (AFL) module 20. The headlamps 16 and 18 provide the source of illumination for generating a beam of light for illuminating the road of travel. The AFL module 20 re-directs the headlamps 16 and 18 from a first direction to a second direction by either electronic steering of the headlamps or mechanical steering of the headlamps. AFL systems are utilized to enhance the driver's vision and awareness of the road of travel when the vehicle is cornering at night; however, as will be described herein, the headlamps 16 and 18 are re-directed for enhancing machine vision for object detection. The headlamps are individually controlled by swiveling each headlamp via controlled steering up to a predetermined number of degrees (e.g., 20 degrees). Typically the headlamps are rotatable in a horizontal direction while the vehicle is cornering based on a steering angle of the vehicle and the vehicle speed. The AFL controller 22 determines the angle that the ALF module 20 needs to rotate the headlamps 16 and 18.

The active vision system 10 is used to selectively and timely redirect the headlamps 16 and 18 so that the headlamp beam uses the headlamp beams to selectively illuminate the path of travel for making the road visible to the driver during a first cycle time and then selectively makes a capture region visible when images are captured by the image capture device during a second duty cycle. In the embodiments described herein, the active vision system 10 is used to selectively and timely redirect the headlamps 16 and 18 from a primary region to the secondary region so that the targeted region is illuminated at a time when the captured image device captures and processes an image of the illuminated scene. The primary region is the road of travel of the vehicle whereas the secondary region is a region other than the primary region that may contain objects or matters of interest.

An image processing bundle unit 24 communicates with the image capture device 12 and the headlamp control unit 14 for determining which frames to process. The communication between the headlamp control unit 14 and the image processing bundle unit 24 may utilize a communication bus 26, such as a high speed CAN. The image processing bundle unit 24 synchronizes with the headlamp control unit 14 so that the image capture device 14 captures and processes images at a time when one or both headlamps 16 and 18 are re-directed to the secondary region from the primary region exterior of the vehicle. The headlamps 16 and 18 include an LED light array with fast electronic control. The LED light array is duty cycled, preferably low duty cycle switching, so that the headlamps may be synchronized with the capture and processing of the image capture device 14. The duty cycle provides timing details that identifies at what rate the frames from the capture image device are processed and when the illumination from the headlamps will be directed on the secondary region. The duty cycle is determined by the AFL controller 22 based on a respective system operating mode that identifies the type of scanning mode that the image capture device will be operating under. For example, the active lighting system may be operating in modes that utilize an azimuth glance operating mode, an elevation operating mode, or a scanning operating mode.

The azimuth glance operating mode includes redirecting the one or both headlamps 16 and 18 in a horizontal direction for capturing details of the environment along or on the sides of the road. For example, the azimuth glance operating mode includes a road geometry determination mode, a road-side sign recognition mode, a pedestrian detection mode, a deer detection mode, or road-side object definition mode. The road geometry determination mode operates so that the camera is actuated to capture images in the road of travel and the sides of the traveled road for identifying a geometry of the road. The road-side sign recognition mode operates so that the camera is actuated to capture images to the sides of the traveled road for identifying locations where road signs are potentially located. The pedestrian recognition mode operates so that the camera is actuated to capture images to the sides of the traveled road for identifying locations where pedestrians are potentially located. An animal recognition mode operates so that the camera is actuated to capture images to the sides of the traveled road for identifying locations where animals are potentially located. The road-side object recognition mode operates so that the camera is actuated to capture images to the sides of the traveled road for identifying locations where road-side objects are potentially located.

The elevation glance mode includes redirecting the one or both headlamps 16 and 18 in a vertical direction to provide illumination in those regions so the image capture device may capture details of the objects elevated above the road. Such objects may include overhead signs and other overhead objects.

The scanning mode includes redirecting the one or both headlamps 16 and 18 so that an object horizontally displaced and vertically displaced along the road may be identified, such as when the vehicle is traveling in an urban setting.

The operating mode identifies what regions in relation to the traveled road that the image capture device 12 will be capturing/processing images. Utilizing the selected operating mode, the headlamp control unit 14 will identify the duty cycle as to when the illumination will be will re-directed to the secondary region associated with the selected operating mode. The duty cycle is determined by the selected operating mode in addition to other factors including but not limited to, vehicle speed, time of day, and sensed lighting conditions of the road. The determined duty cycle will be provided to the imaging processing bundle unit 24 for synchronizing the headlamp control unit 14 and the vehicle capture device 12 for capturing and processing images when the respective secondary region targeted by the image capture device 12 is selectively illuminated by the re-directed headlamps 16 and 18. The illumination as generated by the headlamps 16 and 18 is rapidly switched for redirecting the headlight beam so that the re-direction of the headlamp beam goes essentially unnoticed by the driver of the vehicle. The purpose is to not disturb the lighting of the traveled road by rapidly redirecting the headlight beams to the secondary region using a low duty cycle so that objects exterior to the vehicle may be captured using enhanced machine vision. That is, without adequate lighting or night imaging devices, which are expensive, a low cost capture image device would be unable to capture frames in adequate resolution for identifying objects within the captured frames due to inadequate lighting.

The viewing angle as captured by the image capture device 12 is often adequate to capture the entire road and surrounding regions; however, not all objects captured within viewing angle may have adequate light directed on them for machine recognition analysis of the object. Therefore, it is pertinent to have the targeted region of the viewing angle illuminated. The vehicle's AFL system is used to selectively and timely redirect the headlamps from the primary region to the secondary region so that the targeted region is illuminated at a time when the captured image device captures and processes the illuminated secondary region. Alternatively, the image capture device 12 may be steerable such that the camera is rotatable for capturing the secondary region if the secondary region cannot be captured in a fixed camera view. Both the image capture device 12 and the headlamps 16 and 18 would be synchronized to steer to the secondary region at the time determined by the duty cycle.

The active vision system 10 may further include a body control module 28 and a wireless radio unit 30. The wireless radio unit 28 is configured to obtain navigation information relating to the road of travel. The body control module 28 is coupled to the headlamp control unit 14, preferably through the communication bus 26, and the wireless radio unit 30 for providing geographical information to the headlamp control unit 14. The geographical information relating to the road of travel provides the type of area that the vehicle is traveling along (e.g., urban, rural). The wireless radio may include, but not limited to, the navigation unit, V2V/V2X communications, or OnStar®. The headlamp control unit 14 utilizes the geographical information for determining when to actuate the image capture device and re-direct the headlamp beams. That is, the geographical information may be used to provide advance notice to the active vision system of an upcoming geographical obstacle (e.g., intersection) so that the active vision system may actuate the image camera device 12 and re-direct the headlamps 16 and 18 at the appropriate time.

The active vision system 10 may further include an instrument panel control unit 32 that communicates with the other control units within the active vision system 10. The instrument panel control unit 32 may allow the driver to manually select the system operating mode. Moreover, the instrument panel control unit 32 may include an output notification device that warns the driver of the detected object or scene. The notification may include an audible or visual output.

Figure 2:
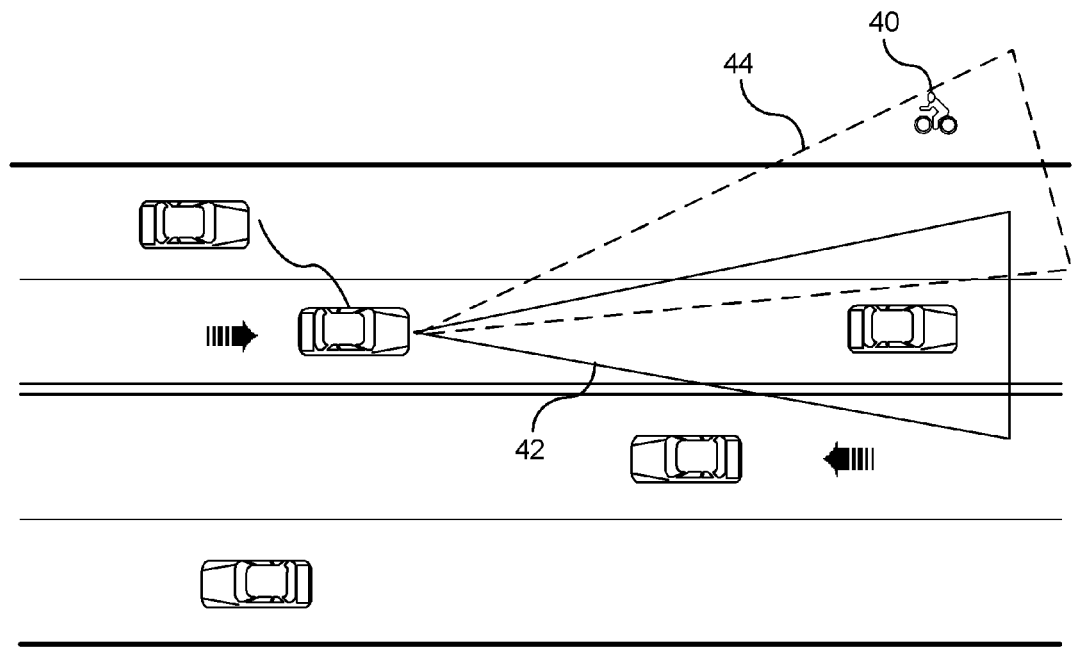
FIG. 2 is an exemplary illustration of headlamp beam re-direction.
Figure 3:
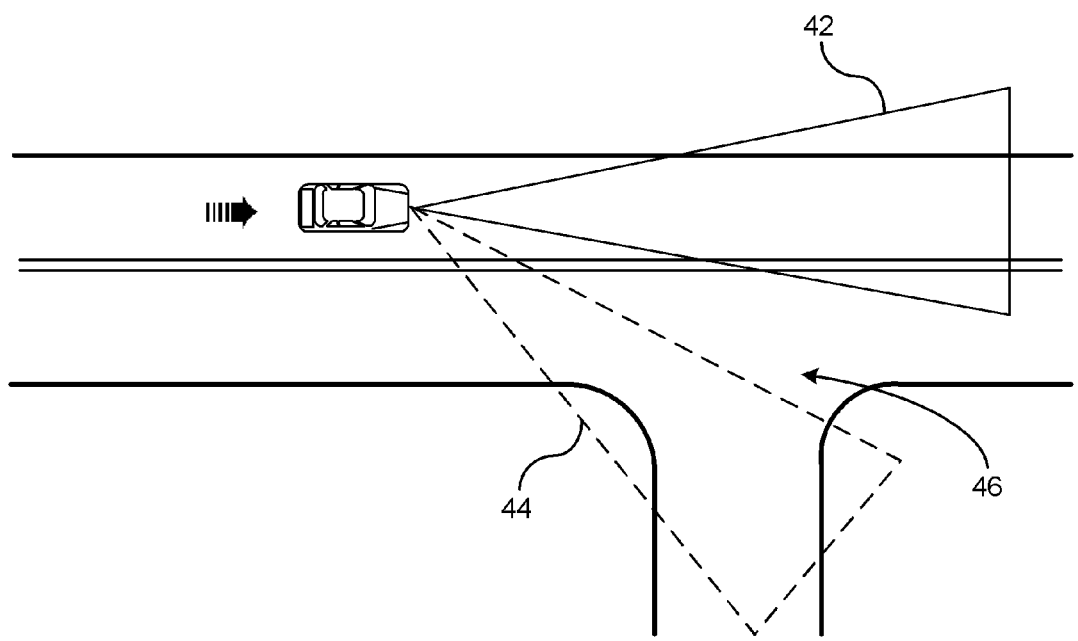
FIG. 3 is another exemplary illustration of headlamp beam re-direction.

FIGS. 2 and 3 illustrate respective operating system modes in which the vehicle headlamps are redirected from the primary region to a secondary region for capturing images in a respective portion of the viewing angle of the image capture device.

In FIG. 2, the system is operating in pedestrian operating mode wherein the active vision system is focused on detecting pedestrians to the side of the road. Based on the operating system mode, the image capture device focuses on a portion of the captured image where a pedestrian 40 may be present. Also, the duty cycle is determined for re-directing the headlamps to the secondary region based on the system operating mode, the current lighting conditions, and the vehicle speed. The duty cycle utilizes fast electronic switching and a low duty cycle so that the re-direction of the illumination from the primary region 42 (i.e., the lane of the traveled road) to the secondary region 44 (e.g., side of the road where a pedestrian may potentially be located) is not noticeable to the driver.

FIG. 3 illustrates another preferred embodiment wherein the active vision system is operating in a road geometry determination mode. The active vision system redirects the headlamps from the primary region 42 (i.e., path of travel) to the secondary region 44 for illuminating a side of the road to detect the geometry of the road such as an intersection 46. This may be utilized in conjunction with a navigation system which provides an advanced indication of where an intersection may be located particularly when poorly lit road conditions are present. Based on the duty cycle, the active vision system redirects the headlamp beams for determining the geometry of the road and the upcoming intersection.

Figure 4:
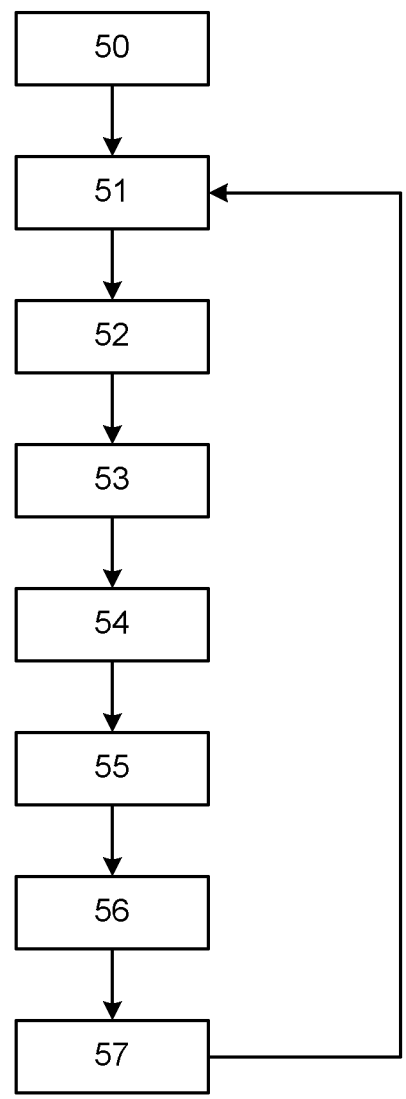
FIG. 4 is a flowchart of a method for re-directing headlamp beams.

FIG. 4 illustrates a flow chart for executing the active vision system. In step 50, the driving scenario is evaluated. A determination is made as to the type of environment that the vehicle is driving in. For example, the determination may be that that the vehicle is driving in an urban setting or rural setting based on the speed and number of stops. The determination may be based on the data from the wireless radio or based on driver selection.

In step 51, the system operating mode as described earlier is determined for active vision system. The mode is selected based on the driving scenario, the vehicle speed, and lighting conditions. Various other conditions may be used to determine the operating mode such as a saliency map relating to the traveled road and environment as well as driver input.

In step 52, a duty cycle is determined and applied for re-directing the headlamps to the secondary region. For a determination of the duty cycle, the image capture device may initially be set as a function of the number of frames captured by the image capture device. For example, if the image capture device is capturing thirty frames per second, the duty cycle may be one out of thirty frames. However, the number of frames for the duty cycle may be increased or decreased based on the speed of the vehicle.

In step 53, the controls for the AFL module and the image capture device/frame processing are synchronized. Synchronization allows the image capture device to capture and process frames of the secondary region at a same instance of time when the headlamp beams are redirected onto the secondary region for illuminating the secondary region.

In step 54, the image is captured and enhanced vision processing is conducted on the secondary region.

In step 55, the object detection analysis is performed on the captured image for detecting an object.

In step 56, an output notification may be provided to the driver or to any of the advanced safety systems of the vehicle which are used for safety analysis or for driver awareness features.

In step 57, the operating mode scenario is updated and lighting adjustments are provided for updating the duty cycle. A return is made to step 51.

While certain embodiments of the present invention have been described in detail, those familiar with the art to which this invention relates will recognize various alternative designs and embodiments for practicing the invention as defined by the following claims.

What is claimed is:

1. An active vision system for a vehicle comprising:
an image capture device for capturing images in a region exterior of a vehicle; and
a headlamp control unit for controlling a vehicle headlamp beam for illuminating an environment exterior of a vehicle, the headlamp control unit configured to selectively illuminate between making a path of travel of the vehicle along a road visible to a driver of the vehicle and making the region exterior of the vehicle visible for capturing images by the image capture device including the headlamp control unit directing the vehicle headlamp beam in a first direction for illuminating a primary region for illuminating the path of travel and re-directing the vehicle headlamp beam in a second direction for illuminating a secondary region;
wherein the headlamp control unit utilizes a duty cycle for controlling a first cycle time that the vehicle headlamp beam illuminates the path of travel for making the road visible to the driver and for controlling a second cycle time that the vehicle headlamp beam makes the region visible for capturing images by the image capture device,
wherein the image capture device is synchronized with headlamp control unit for capturing images in the secondary region when headlamp beam is redirected in the second direction, and
wherein the image capture device is steerable to a respective position for capturing images in the secondary region.

2. The active vision system of claim 1, wherein synchronization of the image capture device with the headlamp control unit allows the image capture device to initiate capture of the secondary region only at an instance of time when the headlamp beams are redirected onto the secondary region for illuminating the secondary region.

3. The active vision system of claim 1, wherein the headlamp control unit operates in one of a plurality of system operating modes, each of the plurality of system operating modes redirecting the headlamp beam in a respective direction other than the first direction.

4. The active vision system of claim 3, wherein the system operating mode includes an azimuth glance operating mode, wherein the headlamp control unit redirects the headlamp beam horizontally between the primary region and the secondary region.

5. The active vision system of claim 4, wherein the primary region is the path of travel of the vehicle and the secondary region is an azimuth view of the road offset from the path of travel of the vehicle.

6. The active vision system of claim 4, wherein the primary region is the path of travel of the vehicle and the secondary region is sides of the road for identifying a geometry of the road.

7. The active vision system of claim 4, wherein the primary region is the path of travel of the vehicle and the secondary region is a location where road signs are potentially located.

8. The active vision system of claim 4, wherein the primary region is the path of travel of the vehicle and the secondary region is a location where pedestrians are potentially located.

9. The active vision system of claim 4, wherein the primary region is the path of travel of the vehicle and the secondary region is a location where animals are potentially located.

10. The active vision system of claim 4, wherein the primary region is the path of travel of the vehicle and the secondary region is a location where road side objects are potentially located.

11. The active vision system of claim 3, wherein the system operating mode includes an elevation glance operating mode, wherein the headlamp control unit redirects the headlamp beam vertically between the primary region and the secondary region.

12. The active vision system of claim 11, wherein the primary region is a path of travel of the vehicle and the secondary region is an elevated view relative to the road.

13. The active vision system of claim 11, wherein the primary region is a path of travel of the vehicle and the secondary region is a location where overhead signs are potentially located.

14. The active vision system of claim 11, wherein the primary region is a path of travel of the vehicle and the secondary region is a location where overhead objects are potentially located.

15. The active vision system of claim 3, wherein the system operating mode includes a scanning mode, wherein the headlamp control unit redirects illumination of the vehicle headlamp beam between the path of travel and both sides of the road while in the scanning mode.

16. The active vision system of claim 3, further comprising an instrument panel control unit for allowing a driver to manually select the system operating mode.

17. The active vision system of claim 1, further comprising a body control module and a wireless radio unit, the wireless radio unit configured to obtain navigation information relating to the path of travel of the vehicle, the body control module coupled to the headlamp control unit and the wireless radio unit, the body control module obtaining geographical information relating to the path of travel of the vehicle from the wireless radio unit, the body control module coordinating with the headlamp control unit for re-directing the headlamp beam to the secondary region when the vehicle approaches a respective geographical location based on the geographical information.

18. The active vision system of claim 17, wherein the headlamp control unit utilizes the geographical information to select a respective system operating mode.

19. The active vision system of claim 1, wherein the controller adjusts the duty cycle as a function of a speed of travel of the vehicle.

20. The active vision system of claim 1, further comprising an image processing control unit coupled between the headlamp control unit and the image capture device, wherein the image processing control unit synchronizes with the headlamp control unit for processing images captured from image capture device at respective times during the duty cycle.

* * * * *